US010826970B2

(12) United States Patent
Walsh

(10) Patent No.: US 10,826,970 B2
(45) Date of Patent: Nov. 3, 2020

(54) SYSTEMS AND METHODS FOR TERMINAL EMULATION AND TERMINAL EMULATORS

(71) Applicant: TERMYSEQUENCE LLC, Odenton, MD (US)

(72) Inventor: Eamon F. Walsh, Odenton, MD (US)

(73) Assignee: TermySequence LLC, Odenton, MD (US)

(*) Notice: Subject to any disclaimer, the term of this patent is extended or adjusted under 35 U.S.C. 154(b) by 0 days.

(21) Appl. No.: 16/407,349

(22) Filed: May 9, 2019

(65) Prior Publication Data
US 2019/0349419 A1 Nov. 14, 2019

Related U.S. Application Data

(60) Provisional application No. 62/669,069, filed on May 9, 2018.

(51) Int. Cl.
*H04L 29/08* (2006.01)

(52) U.S. Cl.
CPC ............ *H04L 67/08* (2013.01); *H04L 67/141* (2013.01)

(58) Field of Classification Search
CPC combination set(s) only.
See application file for complete search history.

(56) References Cited

U.S. PATENT DOCUMENTS

| 5,659,788 | A | * | 8/1997 | Someya | G06F 13/107 703/27 |
| 6,295,075 | B1 | * | 9/2001 | Janay | G06F 3/0481 715/747 |
| 6,862,564 | B1 | * | 3/2005 | Shue | H04L 69/325 370/395.1 |
| 7,165,191 | B1 | * | 1/2007 | Vakrat | G06F 11/26 714/38.1 |
| 2002/0198934 | A1 | * | 12/2002 | Kistler | H04L 69/329 709/203 |
| 2003/0061277 | A1 | * | 3/2003 | Hartmann | H04L 67/08 709/203 |
| 2003/0105606 | A1 | * | 6/2003 | Poley | G06F 11/2294 702/118 |

(Continued)

*Primary Examiner* — Philip J Chea
*Assistant Examiner* — Wuji Chen
(74) *Attorney, Agent, or Firm* — Karceski IP Law, PLLC

(57) ABSTRACT

A system for terminal emulation includes a first processor, a first terminal emulator being addressable by a first identifier, and a first router incorporated into the first terminal emulator. The system also includes a second processor, a second terminal emulator being addressable by a second identifier, and a second router incorporated into the second terminal emulator. A first bidirectional connection exists between the first terminal emulator and the second terminal emulator. A first terminal is addressable by the second terminal emulator via a third identifier over a second bidirectional connection. A second terminal is addressable by the second terminal emulator via a fourth identifier over a third bidirectional connection. The first and second routers facilitate communication between the first terminal emulator and both the first terminal and the second terminal via the first bidirectional connection via the first identifier, the second identifier, the third identifier, and/or the fourth identifier.

16 Claims, 14 Drawing Sheets

(56) References Cited

U.S. PATENT DOCUMENTS

| | | | |
|---|---|---|---|
| 2004/0090959 A1* | 5/2004 | Cinghita | H04L 12/1836 |
| | | | 370/390 |
| 2005/0203892 A1* | 9/2005 | Wesley | G06F 21/6227 |
| 2006/0123101 A1* | 6/2006 | Buccella | G06F 21/554 |
| | | | 709/223 |
| 2011/0172986 A1* | 7/2011 | Yaffe | G06F 9/452 |
| | | | 703/26 |
| 2016/0212641 A1* | 7/2016 | Kong | H04B 17/0087 |
| 2017/0285886 A1* | 10/2017 | Klima | G06F 3/0482 |
| 2018/0115588 A1* | 4/2018 | Wysocki | H04L 63/1416 |

* cited by examiner

| Emulator Identifier | Outgoing Connection | Other Data... |
|---|---|---|
| E-2 ~9 | 1 ~31 | ... ~32 |
| E-5 | 2 | |
| E-1 ~33 | - ~34 | |
| E-4 | 3 | |
| E-6 | 2 | |

| Terminal Identifier | Outgoing Connection | Other Data... |
|---|---|---|
| T-3 ~11 | 1 ~31 | ... ~36 |
| T-6 | 3 | |
| T-1 ~37 | - ~34 | |
| T-2 | - | |
| T-9 | 2 | |

| Client Identifier | Incoming Connection | Other Data... |
|---|---|---|
| C-9 ~10 | 1 ~39 | ... ~40 |
| C-8 | 2 | |
| C-3 | 2 | |
| C-4 | 3 | |
| C-6 | 4 | |

| Client Identifier | Incoming Connection |
|---|---|
| C-9 ~42 | - ~34 |

SYSTEMS AND METHODS FOR TERMINAL EMULATION AND TERMINAL EMULATORS

CROSS-REFERENCE TO RELATED APPLICATION(S)

This United States Non-Provisional Patent Application relies for priority on U.S. Provisional Patent Application Ser. No. 62/669,069, filed on May 9, 2018, the entire content of which is incorporated herein by reference.

FIELD OF THE INVENTION

The present invention relates generally to terminal emulation and more particularly to systems and methods for the interconnected operation of terminal emulators and the display of terminal contents.

DESCRIPTION OF RELATED ART

A terminal is a hardware device used for entering data into and displaying data from a computer system. The primary functions of a terminal are its input function, by which data is received from a user, and its output function, by which data is displayed to the user. Terminals may support the display of graphical content such as images and video or may be limited to the display of text only.

A terminal emulator is a software application or other device which imitates the functions of terminal hardware using another means for the display and input of data. For example, a terminal emulator running on a personal computer system may display data to and receive input from a graphical window resembling the physical screen of a terminal. Some terminal emulators implement industry standards for terminal behavior rather than imitating the functions of any specific hardware terminal. Still other terminal emulators imitate the functions of other terminal emulators rather than those of hardware terminals.

Much software originally written to be used with terminal hardware is still in popular use. This body of terminal-based software includes, but is not limited to, command shells, text editors, compilers, file and directory managers, and database clients. Due to the continued popularity of terminal-based software, terminal emulators are commonly used in modern technical, scientific and engineering fields. New terminal-based software is still being developed.

Terminal-based software is often used for remote computing applications. In a typical scenario, terminal-based intermediary software is run which establishes a connection to a remote host. Then, terminal-based software such as a command shell is executed on the remote host by the intermediary software. In addition to remote computing, intermediary software is also commonly used to run programs as other users on the same host computer or to run programs within virtual computer systems on the same host.

However, there is at least one problem associated with prior art terminal-based intermediary software such as Secure Shell (SSH) or Switch User (SU). Specifically, prior art terminal-based intermediary software only establishes one connection at a time. Moreover, prior art terminal-based intermediary software only establishes that connection in the context of a single terminal.

When working within the context of heterogeneous, highly networked, or virtualized computing environments, users may execute terminal-based software on many different hosts. Sometimes, multiple connections may be required to reach a host. It is desirable to have a system of terminal emulation which better supports such computing environments, and which existing terminal-based intermediary software may still be used to establish connections between hosts.

Modern work practices are often highly collaborative. It is desirable to have a system of terminal emulation in which multiple users may participate. It is desirable to have a system by which emulated terminals may be assigned ownership information. Such a system would enable terminal emulators to reject terminal input data unless it was transmitted by the user matching the ownership information of the terminal to which the input data is directed.

Terminal-based software often has access to a file system containing files and directories. In many operating systems, software programs, including terminal-based software, maintain a "current directory" within a file system which may change from time to time. It is desirable to provide a system by which information about the current directory of terminal-based software may be included in the output data of emulated terminals.

With the rise of graphical user interfaces incorporating large, high-resolution displays, it is common for users of terminal emulators to have many emulated terminals open at once, or to have multiple terminal emulators open at once, in the context of a graphical or windowing interface. It is desirable to have a system of terminal emulation in which input and output data for multiple terminals may be transmitted over one connection. It is desirable to have methods for the organization and depiction of groups of terminals, possibly under the management and control of multiple terminal emulators.

SUMMARY OF THE INVENTION

In view of the foregoing, the present invention provides a system and a method for interacting with two or more terminals using a single bi-directional connection. In other words, among other benefits, the present invention solves the prior art problem where a terminal emulator establishes separate connections to individual terminals.

The present invention provides a system by which terminal emulators may interconnect with other terminal emulators in arbitrary arrangements, including arrangements having multiple interconnections. Within this system, it shall be possible to use existing intermediary terminal-based software to establish connections between terminal emulators.

The present invention also provides methods by which terminal input data and output data may be transmitted within the system of interconnected terminal emulators. These methods shall enable the transmission of terminal output data to multiple users within the system. These methods shall enable the transmission of terminal-specific directory and file information as terminal output data. These methods shall enable concurrent or multithreaded operation of terminal emulators and asynchronous transmission of terminal output data.

Among other features, the present invention also provides a system by which ownership information may be assigned to terminals within the system of interconnected terminal emulators.

One aspect of the present invention encompasses systems for the display of terminal contents. One system provides for the display of terminal content in viewports having dimensions independent of the terminal screen. Within this system, multiple viewports may display terminal contents at different positions within the same emulated terminal. Another system provides for the display within viewports of status indicators and text alongside and in addition to terminal contents. A further system organizes the depiction of multiple emulated terminals, possibly under the management and control of multiple terminal emulators, in a single graphical display element.

As detailed herein, one embodiment of the present invention provides a system for terminal emulation. The system includes a first processor, a first terminal emulator executable on the first processor, the first terminal emulator being addressable by a first identifier, and a first router incorporated into the first terminal emulator. The system also includes a second processor, a second terminal emulator executable on the second processor, the second terminal emulator being addressable by a second identifier, and a second router incorporated into the second terminal emulator. The system incorporates a first bidirectional connection between the first terminal emulator and the second terminal emulator. A first terminal is executable on the second processor, the first terminal being addressable by the second terminal emulator via a third identifier. A second bidirectional connection exists between the first terminal and the second terminal emulator. A second terminal is executable on the second processor, the second terminal being addressable by the second terminal emulator via a fourth identifier. A third bidirectional connection exists between the second terminal and the second terminal emulator. The first router and the second router cooperate to facilitate communication between the first terminal emulator and both the first terminal and the second terminal via the first bidirectional connection by employing at least one of the first identifier, the second identifier, the third identifier, and the fourth identifier.

In another contemplated embodiment, the system includes a terminal input incorporated into the second terminal emulator, wherein the terminal input delivers input data to the first terminal and to the second terminal. This embodiment also is contemplated to include a terminal output incorporated into the second terminal emulator, wherein the terminal output receives output data from the first terminal and from the second terminal.

Still further, the system may include an incoming connector incorporated into the second terminal emulator, wherein the incoming connector establishes an incoming connection to receive messages into the second terminal emulator. Here, an outgoing connector may be incorporated into the second terminal emulator, wherein the outgoing connector establishes an outgoing connection to transmit messages from the second terminal emulator.

It is also contemplated that the messages may include at least one of the third identifier or the fourth identifier.

The outgoing connector may transmit the messages via at least one of the first terminal or the second terminal.

Separately, the system may be configured such that the outgoing connector establishes the second bidirectional connection and the third bidirectional connection for exchanging the messages between the second terminal emulator and the first terminal and the second terminal.

In another contemplated embodiment, a terminal client may be connected to the first terminal emulator, wherein the terminal client generates the input data.

A keyboard may be incorporated into the terminal client for generating the input data.

A display may be incorporated into the terminal client for display of the output data.

Next, the present invention provides a method for terminal emulation. The method includes receiving a message by a first terminal emulator executable on a first processor, wherein the first terminal emulator is addressable by a first identifier and wherein the first terminal emulator incorporates a first router. In addition, the method includes assessing if a first bidirectional connection exists between the first terminal emulator and a second terminal emulator executable on the second processor, wherein the second terminal emulator is addressable by a second identifier and wherein the second terminal emulator incorporates a second router. If the first bidirectional connection exists, the message is transmitted from the first terminal emulator to the second terminal emulator. If the first bidirectional connection does not exist, the first bidirectional connection is established before transmitting the message from the first terminal emulator to the second terminal emulator. Still further, from the second terminal emulator, the method includes forwarding the message to one of a first terminal or a second terminal, wherein the first terminal is executable on the second processor, wherein the first terminal is addressable by the second terminal emulator via a third identifier, wherein a second bidirectional connection exists between the first terminal and the second terminal emulator, wherein the second terminal is executable on the second processor, wherein the second terminal is addressable by the second terminal emulator via a fourth identifier, and wherein a third bidirectional connection exists between the second terminal and the second terminal emulator. Finally, the method includes employing at least one of the first identifier, the second identifier, the third identifier, and the fourth identifier by the first router and the second router to facilitate communication between the first terminal emulator and both the first terminal and the second terminal via the first bidirectional connection.

In one contemplated embodiment, the method also includes delivering input data, via a terminal input incorporated into the second terminal emulator, to the first terminal and to the second terminal and receiving output data, via a terminal output incorporated into the second terminal emulator, from the first terminal and from the second terminal.

In another embodiment, the method may include establishing an incoming connection, via an incoming connector incorporated into the second terminal emulator, to receive messages into the second terminal emulator and establishing an outgoing connection, via an outgoing connector incorporated into the second terminal emulator, to transmit messages from the second terminal emulator.

The messages may include at least one of the third identifier or the fourth identifier.

The messages are contemplated to be transmitted by the outgoing connector via at least one of the first terminal or the second terminal.

It is contemplated that the method also may include establishing, via the outgoing connector, the second bidirectional connection and the third bidirectional connection for exchanging the messages between the second terminal emulator and the first terminal and the second terminal.

In another embodiment, the method may include generating, via a terminal client connected to the first terminal emulator, the input data.

Still further, the terminal client may have a keyboard for generating the input data.

The terminal client may have a display for display of the output data.

In another contemplated embodiment, the method may include identifying, by at least the second terminal emulator, a current directory for one of the first terminal or the second terminal. Here, it is contemplated that the method includes recognizing a change in the current directory and generating an update based on the change.

If an update is created, the method also may include transmitting, by at least the second terminal emulator, the update at least to the first terminal emulator.

Additional features and aspects of the present invention will be made apparent in the paragraphs that follow and by the drawings provided herewith.

BRIEF DESCRIPTION OF THE DRAWINGS

For a more complete understanding of the invention, reference is made to the following description and accompanying drawings, in which:

FIGS. 4a-4d are diagrams of databases contemplated to be used by one embodiment of the system of FIG. 1;

DETAILED DESCRIPTION OF EMBODIMENT(S) THE INVENTION

The present invention will now be described in connection with one or more embodiments. The discussion of any one embodiment is not intended to be restrictive or limiting of the present invention. To the contrary, the embodiments described are intended to be illustrative of the broad scope of the present invention.

Figure 1:
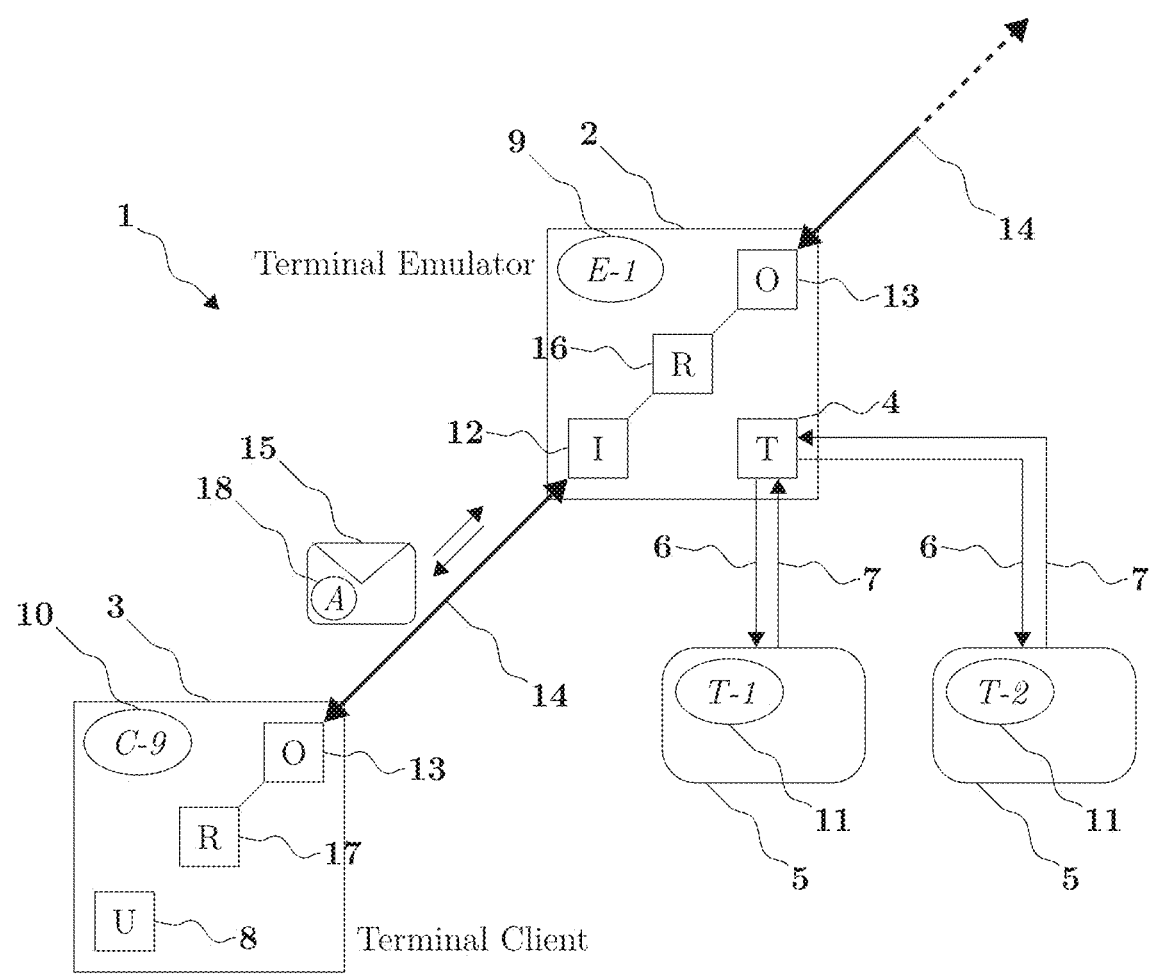
FIG. 1 is a block diagram of one embodiment of a system for terminal emulation which includes terminal emulators and terminal clients.

Referring to FIG. 1, one embodiment of the present invention is shown. FIG. 1 is a simplified block diagram of a system 1 consisting of component systems classified as terminal emulators 2 (hereafter "emulators" and/or "terminal emulators") and terminal clients 3 (hereafter "clients") in any number. Emulators 2, clients 3, and their functions 4, 6, 7, 12, 13, 16, 17 may include software and/or algorithms for fulfilling the operations and techniques as described herein. Alternatively, such operations and techniques may be achieved by any suitable hardware, component, device, application-specific integrated circuit (ASIC), additional software, field programmable gate array (FPGA), server, processor, algorithm, erasable programmable ROM (EEPROM), or any other suitable object that is operable to facilitate such operation. The emulators 2 are contemplated to be executed and/or executable on one or more processors.

Each emulator 2 incorporates terminal emulation function 4 by means of which one or more emulated terminals 5 (hereafter "terminals") may be created under the management and control of the emulator. For each emulated terminal 5, terminal emulation function 4 provides input function 6 by which emulator 2 may deliver terminal input data, and output function 7 by which emulator 2 may receive terminal output data. In some embodiments, terminal emulation function 5 may be implemented by computer operating system facilities and/or software libraries for the creation of pseudo-terminal (PIN) devices. In other embodiments, function 5 may be implemented by state machines, automata, or other models of computation.

Each emulator 2 incorporates incoming connection function 12 and outgoing connection function 13 and each client 3 incorporates outgoing connection function 13, by means of which functions one or more connections 14 may be established from emulator to emulator and from client to emulator in any arrangement. The term "connector" and "connection function" are used interchangeably herein. As should be apparent to those skilled in the art, connections may encompass executable software, hardware, and/or a combination of the two. The present invention is intended to encompass these variants.

Connections 14 are bidirectional communicative channels over which messages 15 containing arbitrary data or information may be exchanged. Connection functions 12, 13 may be implemented using the facilities of a plain old telephone system (POTS), local area network (LAN), metropolitan area network (MAN), wide area network (WAN), wireless local area network (WLAN), virtual private network (VPN), inter-process communications (IPC), intranet, the Internet, or any other appropriate architecture or system that facilitates communications in a network or telephonic environment, including a combination of any networks or systems described above. In various embodiments, connections 14 may be implemented by facilities including, but not limited to, TCP/IP networking, Unix-domain sockets, pipes, and file descriptors.

Incoming connection function 12 and outgoing connection function 13 may vary in implementation from emulator 2 to emulator 2 and client 3 to client 3 within the same embodiment of the present invention, provided that interoperability is maintained. Similarly, the type, medium, and characteristics of connections 14 supported by incoming connection function 12 and outgoing connection function 13 may vary from emulator 2 to emulator 2 and client 3 to client 3 within the same embodiment of the present invention.

Clients 3 are those components of system 1 lacking incoming connection function 12. In some embodiments, clients 3 may incorporate terminal emulation function 4 and may manage and control one or more terminals 5 in the same manner as emulators 2.

It is contemplated that clients 3 incorporate a user interface 8 allowing the users of the present invention to interact with terminals 5 under the management and control of emulators 2. In some embodiments, user interface 8 may be a physical display or input device or set of display and input devices. In other embodiments, user interface 8 may be an element or elements in a graphical windowing system, application desktop, or other software environment for the provision of user interfaces.

Figure 2:
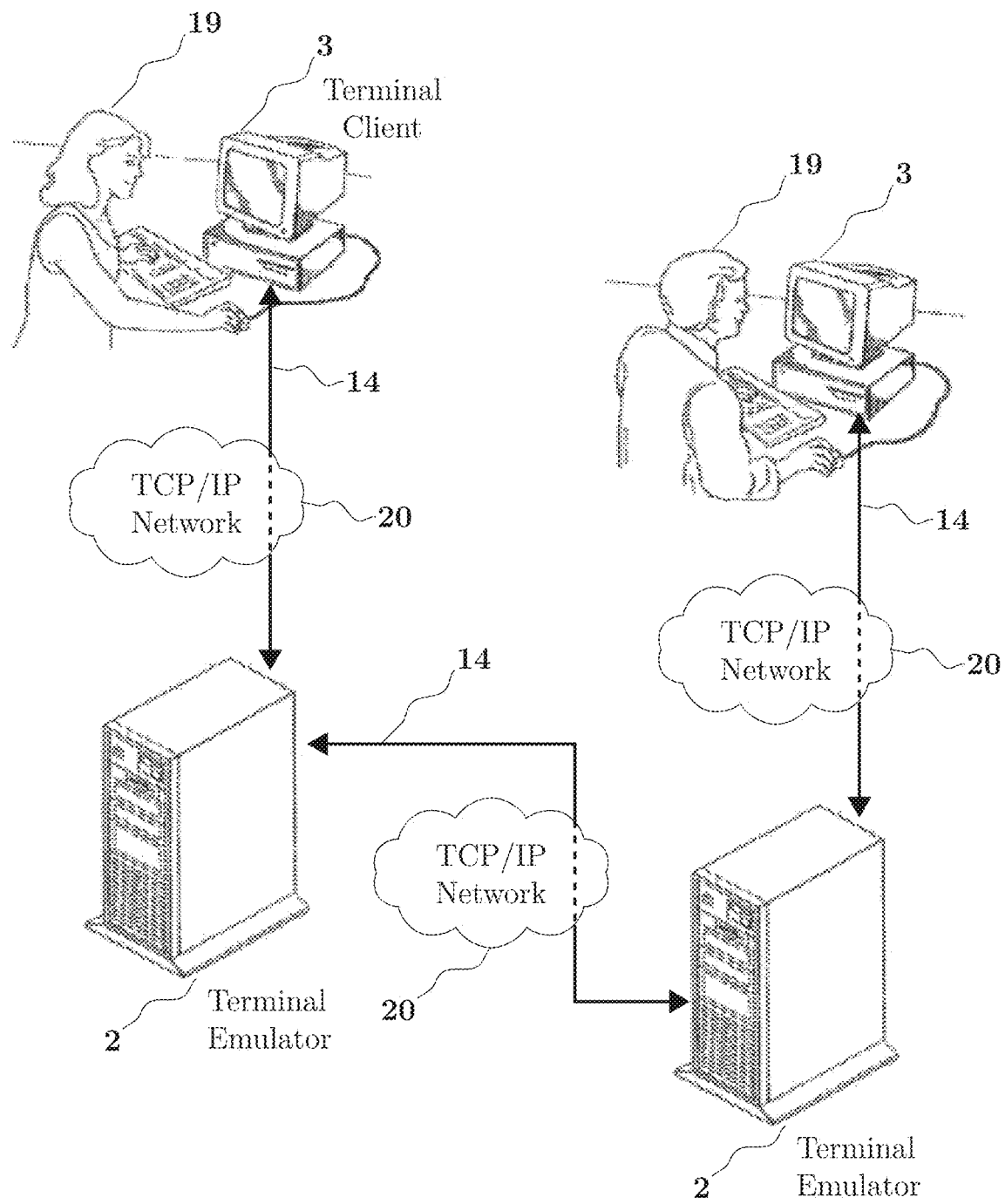
FIG. 2 is a graphical overview of a second embodiment of the system of FIG. 1.

FIG. 2 depicts a contemplated embodiment in which clients 3 are personal computer systems operated by the users 19 of the system of the present invention and in which emulators 2 are network servers. Connections 14 are established by means of TCP/IP networks 20.

Figure 3:
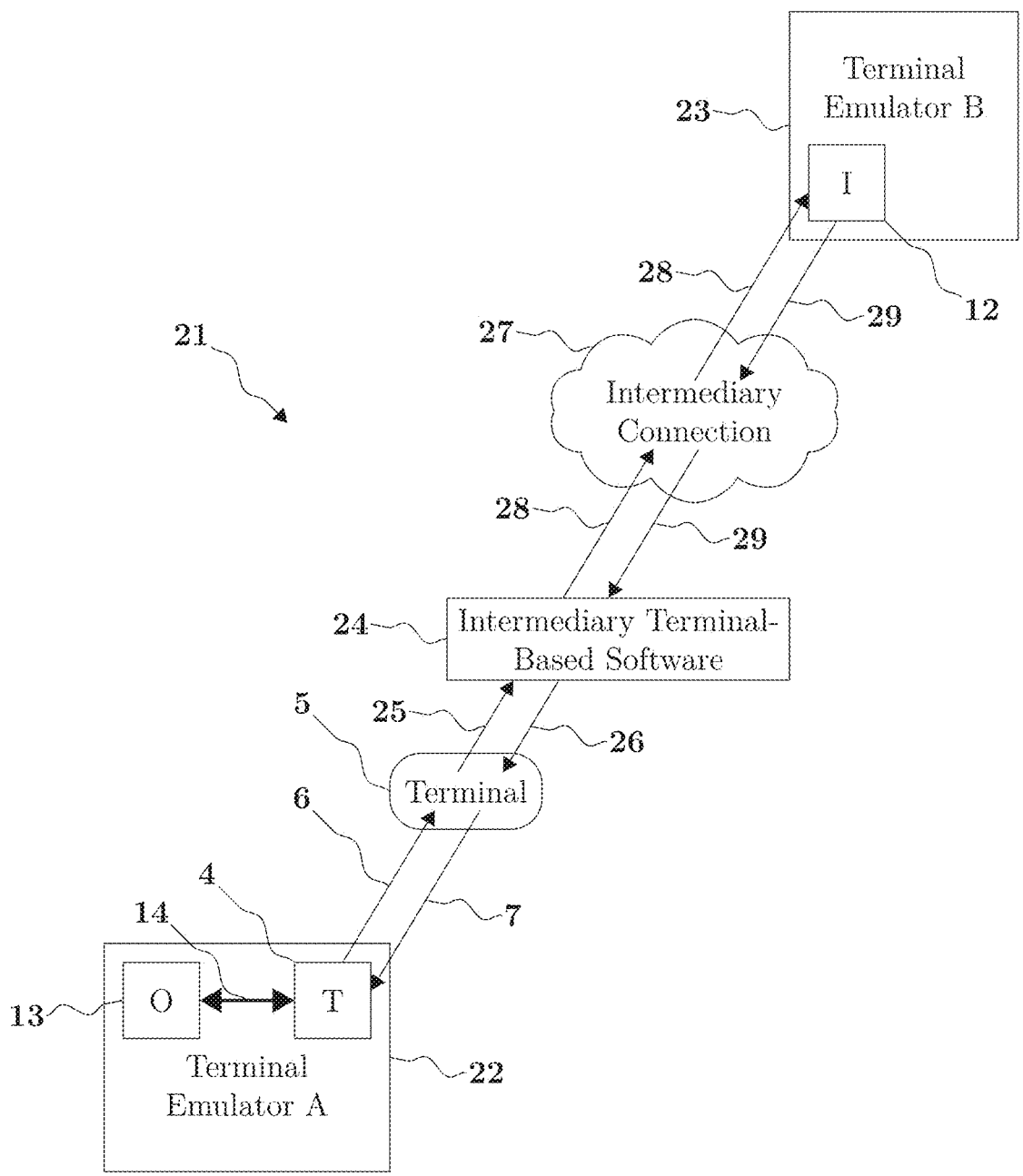
FIG. 3 is a block diagram of a third embodiment of the system of FIG. 1, illustrating a contemplated method by which connections may be formed by means of a terminal.

FIG. 3 depicts another contemplated embodiment in which an emulator 22 incorporating outgoing connection function 13 is capable of establishing a connection 14 to another emulator 23 incorporating incoming connection function 12 by means of a terminal 5 under the management and control of emulator 22 via its terminal emulation function 4 and by means of intermediary terminal-based software 24 (hereafter "software") executing in the context of, associated with, or attached to terminal 5. The software 24, when executed, establishes a bidirectional intermediary connection 27 to emulator 23, comprising incoming channel 28 and outgoing channel 29. Once the intermediary connection 27 is established, the software 24 forwards messages 15 from the terminal input 25 to the outgoing channel 28 and from the incoming channel 29 to the terminal output 26. The combined connection system 21 comprises the terminal input function 6 and output function 7 of emulator 22, the terminal input 25 and terminal output 26 of the intermediary terminal-based software 24, and the incoming channel 28 and outgoing channel 29 of the intermediary connection 27.

"Terminal input" and "terminal input function" are used interchangeably herein. As should be apparent to those skilled in the art, terminal inputs may encompass executable software, hardware, and/or a combination of the two. The present invention is intended to encompass these variants. For the same reason, "terminal output" and "terminal output function" also are used interchangeably herein.

It is contemplated that the software 24 may be designed and implemented for the purpose of establishing connections between emulators 22, 23 within the scope of the present invention. It is also contemplated that software 24 may be general-purpose terminal-based software used to establish connections in various contexts, such software being designed and implemented without prior knowledge of or reference to the present invention. Such software includes, but is not limited to, Secure Shell (SSH) software, Switch User (SU) software, remote execution software, and container runtime software.

It is contemplated that the software 24 may be executed by the outgoing connection function 13. It is also contemplated that the software 24 may be executed within the terminal 5 by a user 19 of the system of the present invention. Such execution may be performed by means of a terminal-based command shell. It is further contemplated that the outgoing connection function may provide a method for users 19 to supply passwords, pass phrases, and any other authentication information requested by software 24 for the purpose of establishing the connection 21. Such authentication information may be provided to the software 24 by means of the terminal input function 6.

In addition to emulators 2, it is contemplated that clients 3 which have terminal emulation function 4 may also support connections established via terminals as previously described.

Returning to FIG. 1, each emulator 2 is assigned an identifier 9, each client 3 is assigned an identifier 10, and each terminal 5 is assigned an identifier 11. Identifiers 9, 10, 11 may consist of integers, sequences of integers, or any other enumerable values. Identifiers 9, 10, 11 may come from the same set of enumerable values or from different such sets. Identifiers 9, 10, 11 may be generated and assigned by any means, including by means of random assignment.

Each emulator 2 incorporates a routing function 16 and each client 3 incorporates a routing function 17 by which messages 15 may be routed from an originating client or emulator to a destination client or emulator across one or more connections 14. In some embodiments, for the purpose of performing such routing functions, messages 15 may contain addressing information 18 which may include identifiers 9, 10, 11. Routing functions 16, 17 may vary in implementation from emulator 2 to emulator 2 and client 3 to client 3 within the same embodiment of the present invention, provided that interoperability is maintained.

In some embodiments, routing functions 16, 17 may implemented by software and/or algorithms incorporating techniques of packet switching, message or traffic forwarding (including store-and-forward techniques), publish-subscribe messaging, or any other software-based and/or algorithmic technique suitable for the purpose. In other embodiments, routing functions 16, 17 may be implemented by hardware routers, switches, bridges, relays, or other network equipment, devices, or mechanisms.

For purposes herein, the term "router" may be used interchangeably with "routing function." As should be understood by those skilled in the art, and as noted above, messages may be routed via executable software, hardware, and/or a combination of the two. The present invention is intended to encompass these variants.

In one contemplated embodiment, routing functions 16, 17 may employ the databases illustrated in FIGS. 4a-4d, As shown in FIG. 4a, each entry in database 30 has an emulator identifier 9 along with information concerning that emulator. One of the stored pieces of information is an identifier 31 for the outgoing connection over which messages addressed to the emulator should be transmitted. Other information 32 about the emulator may also be stored. In the case of routing function 16, the emulator's own identifier 33 may be stored with a special connection identifier 34 indicating that the entry has no associated incoming or outgoing connection.

As shown in FIG. 4b, database 35 is analogous to database 30, but stores information about terminals rather than emulators, including terminal identifier 11, outgoing connection identifier 31, and other information 36 about the terminal. In the case of routing function 16, the identifier 37 for a terminal under the emulator's own management and control may be stored with the special connection identifier 34.

As shown in FIG. 4c, routing function 16 may employ database 38 which is analogous to database 30, but stores information about clients rather than emulators, including client identifier 10, incoming connection identifier 39, and other information 40 about the client. As shown in FIG. 4d, routing function 17 may employ database 41, which is analogous to database 38, but stores only a single entry consisting of the client's own identifier 42 and special connection identifier 34.

An emulator 2 which employs the databases 30, 35, 38 of FIGS. 4a-4c may implement the following contemplated method as part of the operation of routing function 16, using six contemplated types of message 15 designated A, B, C, D, E, and F.

The databases 30, 35, 38 are initially empty;

Upon initial execution, an entry is created in database 30 with the emulator's own identifier 33 and the special connection identifier 34;

Upon the establishment of a new incoming connection, for each entry in database 30, a message 15 of type A containing the emulator identifier 9 from the entry is transmitted on the new incoming connection;

Upon the establishment of a new incoming connection, for each entry in database 35, a message 15 of type B containing the terminal identifier 11 from the entry is transmitted on the new incoming connection;

Upon the creation of a terminal under the management and control of the emulator, an entry is created in database 35 with the terminal identifier 11 and the special connection identifier 34 and a message 15 of type B containing the terminal identifier is transmitted on all incoming connections;

Upon the establishment of a new outgoing connection, for each entry in database 38, a message 15 of type C containing the client identifier 10 from the entry is transmitted on the new outgoing connection;

Upon the closing of an outgoing connection, for each entry in database 30 with the corresponding outgoing connection identifier 31, the entry is removed and a message 15 of type D containing the emulator identifier 9 from the entry is transmitted on all incoming connections;

Upon the closing of an outgoing connection, for each entry in database 35 with the corresponding outgoing connection identifier 31, the entry is removed and a message 15 of type E containing the terminal identifier 11 from the entry is transmitted on all incoming connections;

Upon the destruction of a terminal under the management and control of the emulator, the entry in database 35 with the corresponding terminal identifier 11 is removed and a message 15 of type E containing the terminal identifier is transmitted on all incoming connections;

Upon the closing of an incoming connection, for each entry in database 38 with the corresponding incoming connection identifier 39, the entry is removed and a message 15 of type F containing the client identifier 10 from the entry is transmitted on all outgoing connections;

Upon receipt of a message 15 of type A on an outgoing connection, an entry is created in database 30 containing the emulator identifier 9 from the message and the identifier 31 of the outgoing connection on which the message was received and the message is retransmitted on all incoming connections;

Upon receipt of a message 15 of type B on an outgoing connection, an entry is created in database 35 containing the terminal identifier 11 from the message and the identifier 31 of the outgoing connection on which the message was received and the message is retransmitted on all incoming connections;

Upon receipt of a message 15 of type C on an incoming connection, an entry is created in database 38 containing the client identifier 10 from the message and the identifier 39 of the incoming connection on which the message was received and the message is retransmitted on all outgoing connections;

Upon receipt of a message 15 of type D on an outgoing connection, the entry in database 30 with the emulator identifier 9 from the message is removed and the message is retransmitted on all incoming connections;

Upon receipt of a message 15 of type E on an outgoing connection, the entry in database 35 with the terminal identifier 11 from the message is removed and the message is retransmitted on all incoming connections; and Upon receipt of a message 15 of type F on an incoming connection, the entry in database 38 with the client identifier 10 from the message is removed and the message is retransmitted on all outgoing connections.

A client 3 which employs the databases 30, 35, 41 of FIGS. 4a, 4b, 4d may implement the following contemplated method as part of the operation of routing function 17, using the same contemplated types of message 15 as the previously described method:

The databases 30, 35, 41 are initially empty;

Upon initial execution, an entry is created in database 41 with the client's own identifier 42 and the special connection identifier 34;

Upon the establishment of a new outgoing connection, a message 15 of type C containing the client's own identifier 42 is transmitted on the new outgoing connection;

Upon the closing of an outgoing connection, each entry in database 30 with the corresponding outgoing connection identifier 31 is removed;

Upon the closing of an outgoing connection, each entry in database 35 with the corresponding outgoing connection identifier 31 is removed;

Upon receipt of a message 15 of type A on an outgoing connection, an entry is created in database 30 containing the emulator identifier 9 from the message and the identifier 31 of the outgoing connection on which the message was received;

Upon receipt of a message 15 of type B on an outgoing connection, an entry is created in database 35 containing the terminal identifier 11 from the message and the identifier 31 of the outgoing connection on which the message was received;

Upon receipt of a message 15 of type D on an outgoing connection, the entry in database 30 with the emulator identifier 9 from the message is removed; and Upon receipt of a message 15 of type E on an outgoing connection, the entry in database 35 with the terminal identifier 11 from the message is removed.

Figure 5:
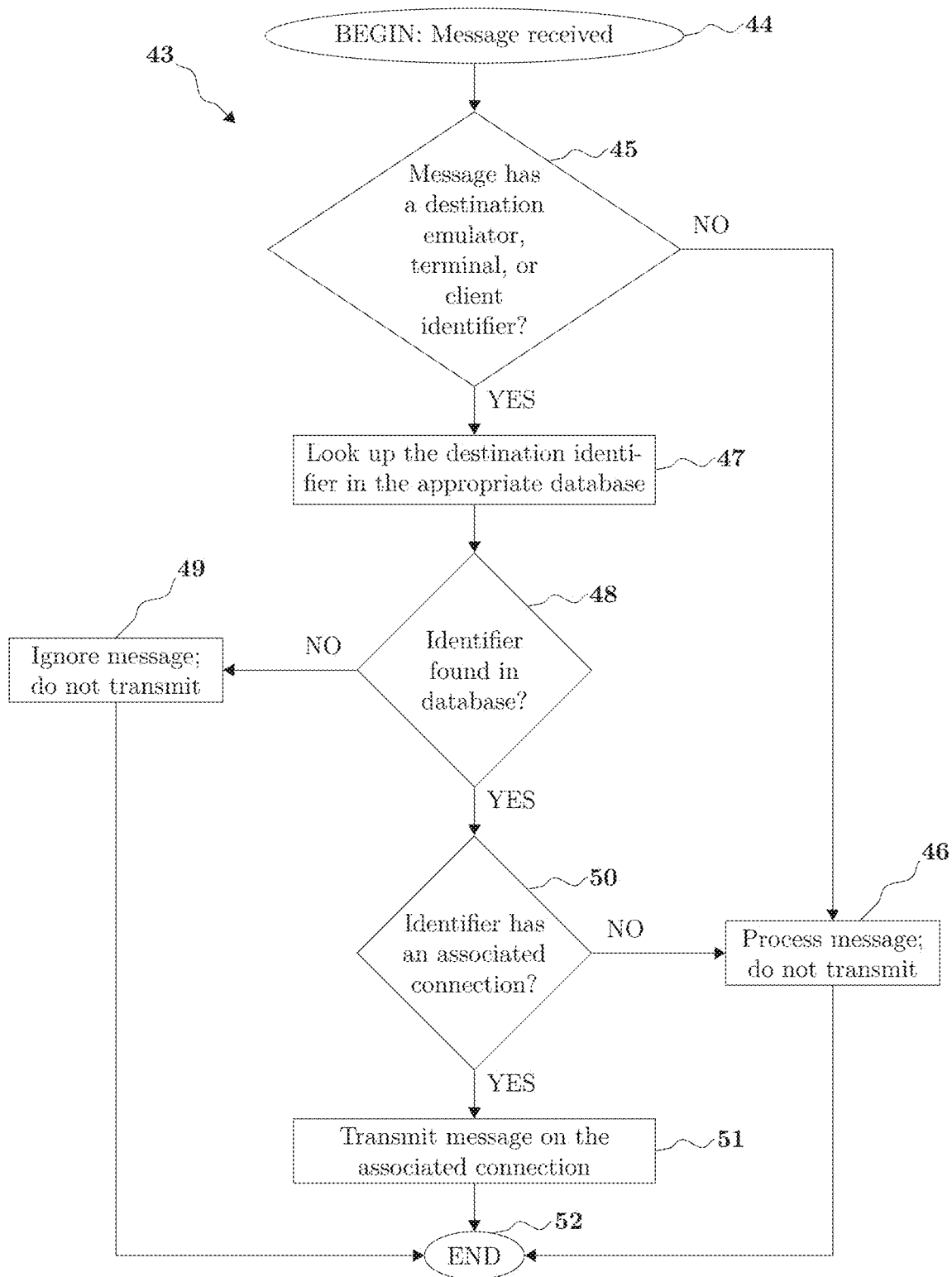
FIG. 5 is a flow chart illustrating one method of operation of the routing function of the system of FIG. 1.

FIG. 5 is a graphical illustration of another method 43 contemplated for the operation of routing functions 16, 17 according to the present invention.

The method 43 starts at step 44 when a message 15 is received by an emulator 2 or client 3 on a connection 14. The method 43 then proceeds to step 45, where the method 43 determines whether the message 15 contains a destination emulator, client, or terminal identifier 9, 10, 11 in its addressing information 18 (if present). If such an identifier is not present, the method 43 proceeds to step 46 where the message and its contents are processed by the emulator 2 or client 3 directly and the message 15 is not retransmitted.

If the message 15 contains a destination identifier, the method 43 proceeds to step 47 where an entry for the identifier is looked up in the appropriate database of FIGS. 4a-4d. If the destination identifier is an emulator identifier 9, the identifier is looked up in database 30. If the destination identifier is a terminal identifier 11, the identifier is looked up in database 35. If the destination identifier is a client identifier 10, the identifier is looked up in database 38 by emulator routing function 16 and in database 41 by client routing function 17. The method then proceeds to step 48.

At step 48, if no entry for the destination identifier is found in the appropriate database, the method 43 proceeds to step 49 where the message 15 and its contents are ignored and the message 15 is not retransmitted.

If an entry for the destination identifier is found, the method 43 proceeds to step 50 where the method 43 determines whether the incoming connection identifier 39 or outgoing connection identifier 31 from the entry is equal to the special connection identifier 34 indicating that the entry has no associated incoming or out-going connection. If this is the case, the method 43 proceeds to step 46 where the message 15 and its contents are processed by the emulator 2 or client 3 directly and the message 15 is not retransmitted. Otherwise, the method 43 proceeds to step 51 where the message 15 is retransmitted on the connection 14 identified by the entry.

Following steps 46, 49, 51, the method 43 proceeds to step 52 where routing of the message 15 is completed.

Without departing from the scope of the present invention, emulator routing functions 16 and client routing functions 17 may employ databases and/or methods other than those described above and/or illustrated in FIGS. 4a-4d and FIG. 5. Databases employed by routing functions 16, 17 may be stored by means of random-access memory (RAM), flash memory, solid-state drive (SSD), hard disk drive (HDD), or any other appropriate system or medium or combination thereof that facilitates storage of data.

Figure 6:
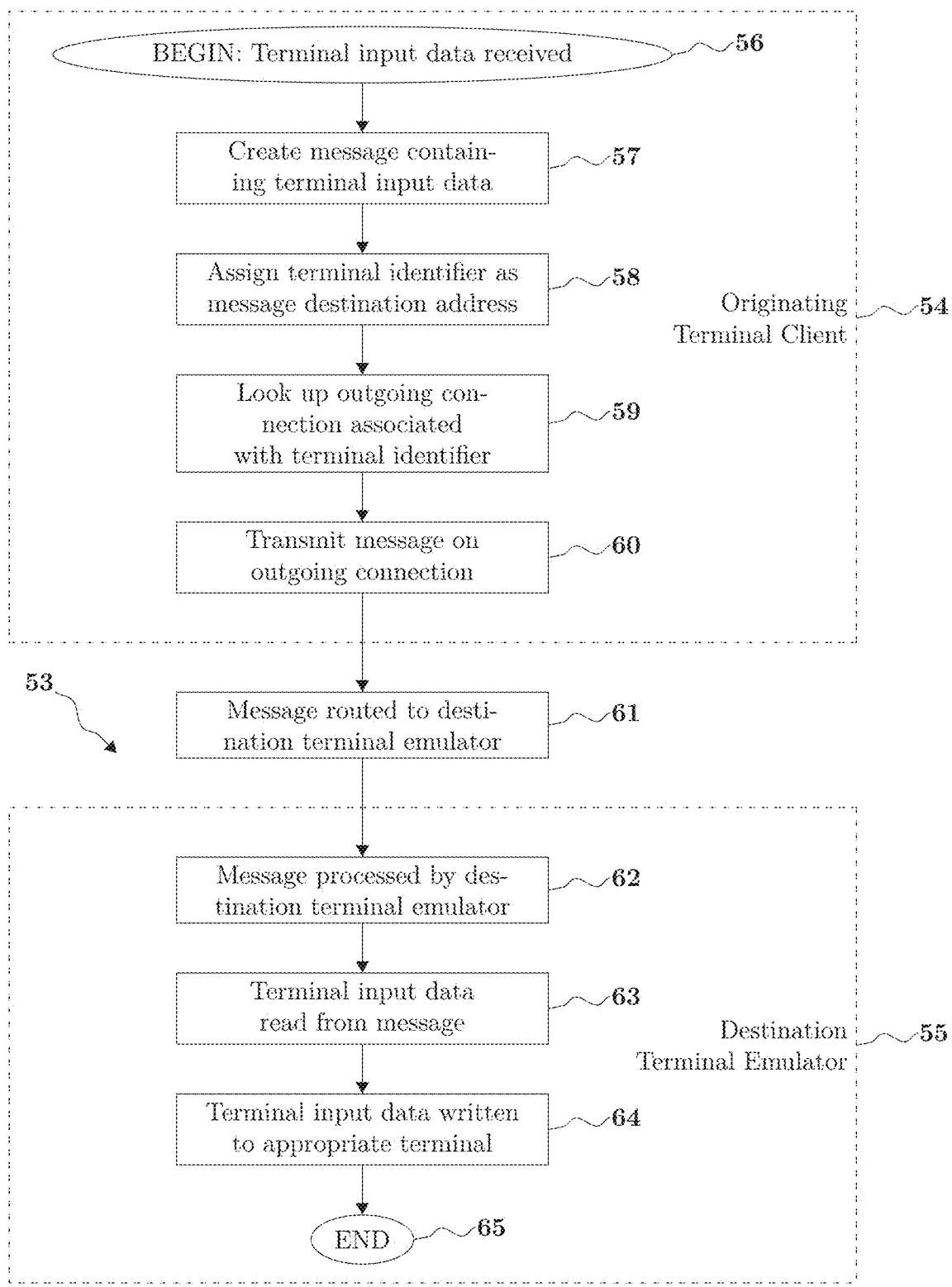
FIG. 6 is a flow chart illustrating a method of operation of the system of FIG. 1 in which terminal input data is transmitted from a terminal client to a terminal emulator.

FIG. 6 illustrates one method 53 contemplated for the transmission of terminal input data from a client 3 to a terminal 5 according to the system of the present invention.

The method 53 starts at step 56 when input data is received by an originating client 54 for a terminal 5 with an identifier 11. The method 53 then proceeds to step 57 where the method creates a message 15 containing the input data. The method 53 then proceeds to step 58 where the address 18 of the message 15 created in step 57 is set to the terminal identifier 11 of the destination terminal.

From step 58, the method 53 proceeds to step 59 where the database entry for the destination terminal identifier 11 is looked up in database 35. The method 53 then proceeds to step 60 where the message 15 created in step 57 is transmitted on the outgoing connection whose identifier 31 is stored in the database entry looked up in step 59.

At step 61 of the method 53, the message 15 created in step 57 is routed over one or more connections 14 by the routing functions 16 of one or more emulators 2 to the emulator 55 managing and controlling the destination terminal 5.

From step 61, the method 53 proceeds to step 62 where the message 15 created in step 57 is processed by the destination emulator 55. The method 53 then proceeds to step 63 where the input data is extracted from the message 15. The method 53 then proceeds to step 64 where the input data is written to the destination terminal 5 by means of the terminal input function 6 implemented by the emulator 55. The method 53 then proceeds to step 65 and completes.

Figure 7:
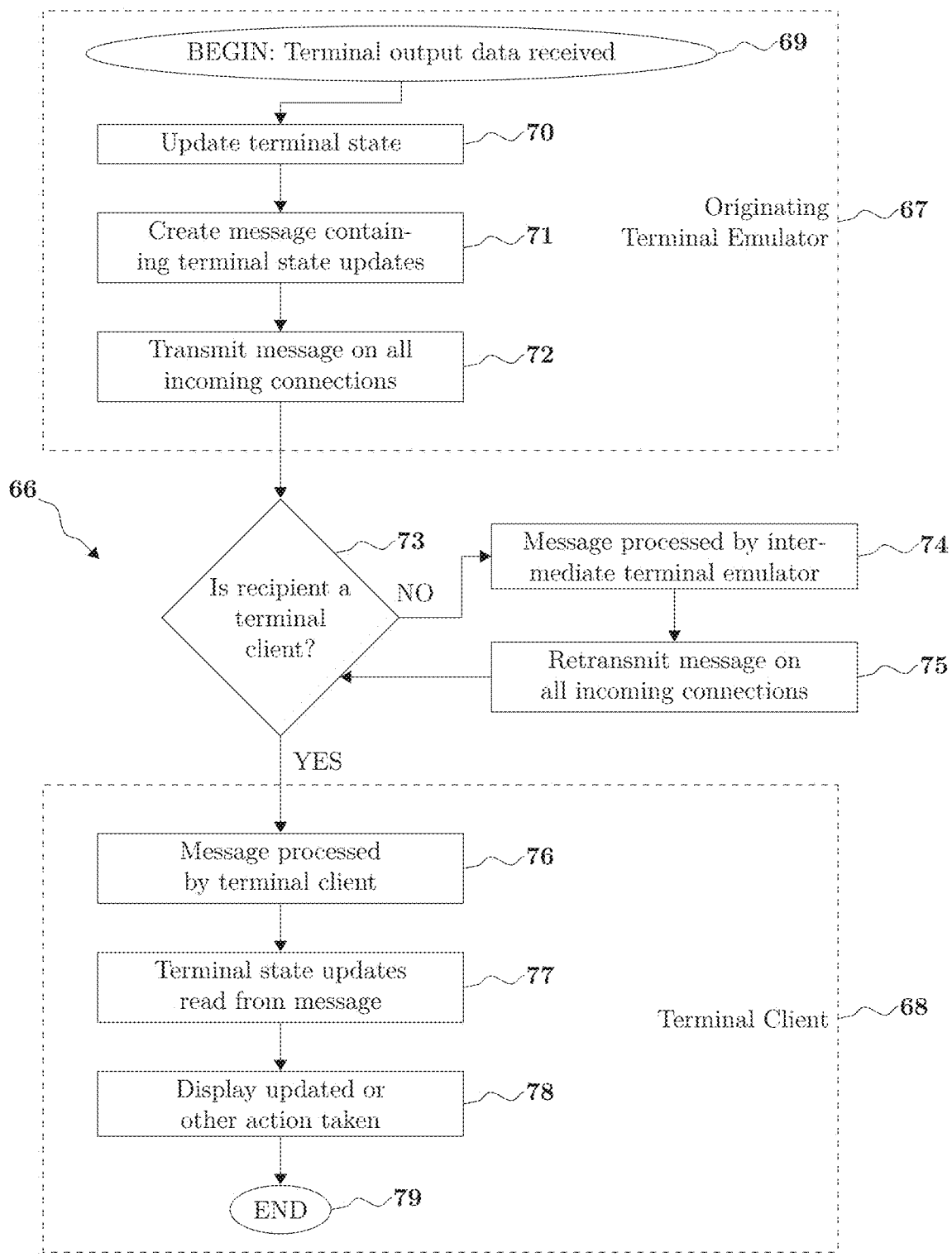
FIG. 7 is a flow chart illustrating a method of operation of the system of FIG. 1 in which terminal state updates are transmitted from a terminal emulator to terminal clients.

FIG. 7 illustrates one method 66 contemplated for the transmission of terminal output data from a terminal 5 to clients 3 according to the system of the present invention.

The method 66 starts at step 69 when output data is received by an originating emulator 67 for a terminal 5 by means of the terminal output function 7 implemented by the emulator 67. The method 66 then proceeds to step 70 where the state of the terminal 5 according to emulator 67 is updated or modified using the output data. Such updates or modifications to terminal state may include changing the contents of the emulated terminal screen, moving the position of the emulated terminal cursor, or any other implementation-specific terminal state changes performed by emulator 2 according to its operation. In some embodiments, it is contemplated that the terminal state referenced by step 70 may be stored by emulators 2 in the other terminal information 36 of database 35 illustrated in FIG. 4b.

From step 70, the method 66 proceeds to step 71 where the method 66 creates a message 15 containing the terminal state updates that resulted from the receipt of the output data and which were applied in step 70. The method 66 then proceeds to step 72 where the message 15 created in the previous step is transmitted on all incoming connections of emulator 67.

At step 73 of the method 66, if the recipient of the message 15 is not a client 3, the method proceeds to step 74 where the message 15 created in step 71 is processed by an intermediate emulator 2. From step 74, the method 66 proceeds to step 75 where the message 15 is retransmitted on all incoming connections of intermediate emulator 2. The method then returns to step 73.

In some embodiments, the message 15 retransmitted by an intermediate emulator at step 75 may differ from the message created at step 71. For example, an intermediate emulator may combine terminal state updates from multiple messages into a single message for retransmission.

At step 73 of the method 66, if the recipient of the message 15 is a client 3, the method 66 proceeds to step 74 where the message 15 created in step 71 is processed by a receiving client 68. The method 66 then proceeds to step 77 where the terminal state updates are extracted from the message 15. The method 66 then proceeds to step 78 where the receiving client 68 acts on the terminal state updates. Such actions may include updating the contents of a physical display or graphical window, generating a sound on a speaker, or any other implementation-specific actions performed by client 68 according to its operation.

After step 78, the method 66 proceeds to step 79 and completes.

Without departing from the scope of the present invention, emulators 2 and clients 3 may employ methods other than those illustrated in FIG. 6 to transmit terminal input data, terminal output data, and/or terminal state updates by means of messages 15.

Figure 8:
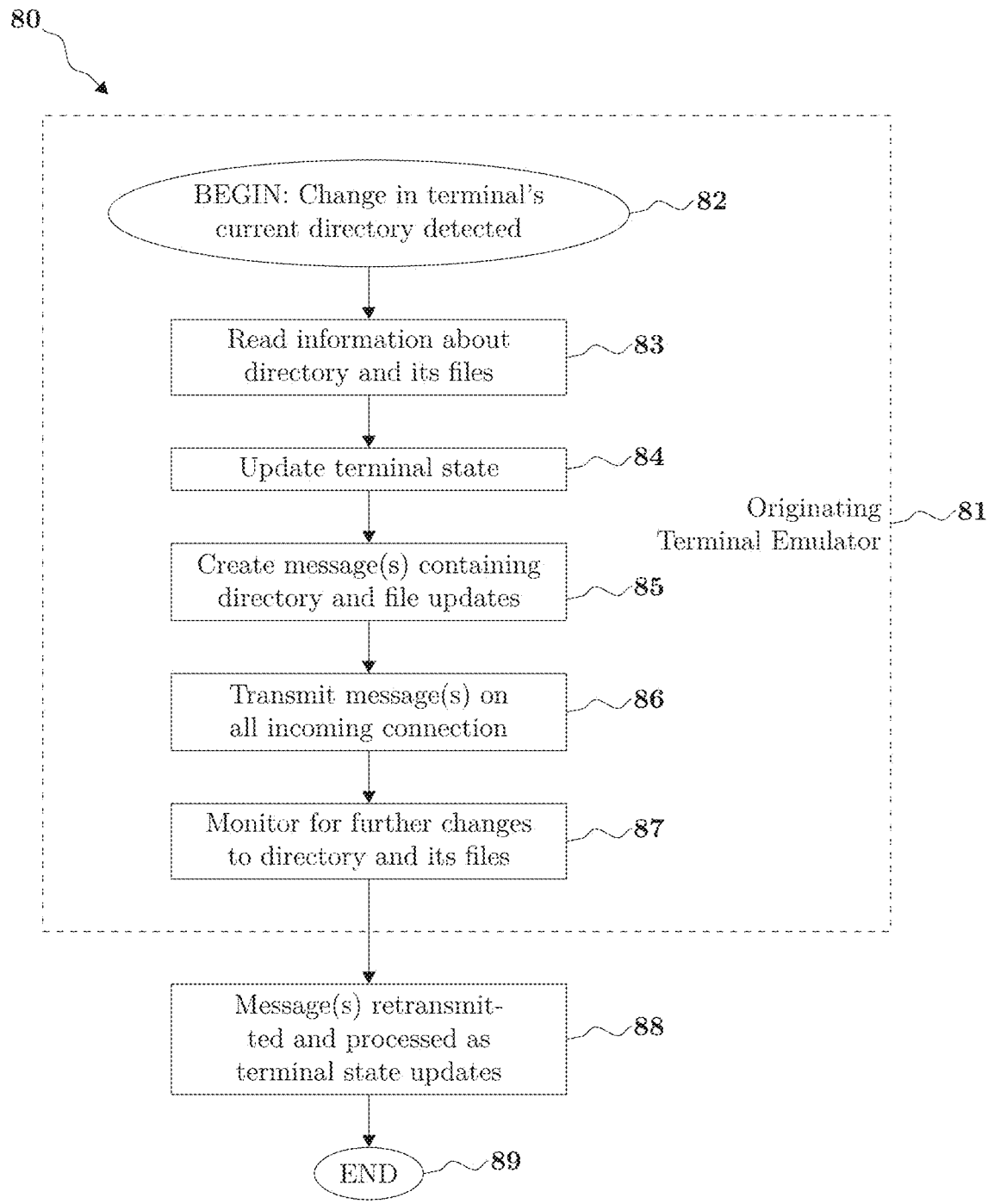
FIG. 8 is a flow chart illustrating a method of operation of the system of FIG. 1 in which terminal state updates comprising directory and file information are transmitted from a terminal emulator to terminal clients.

In some embodiments, terminals 5 or terminal-based software executing in the context of, associated with, or attached to terminals 5 may have a "current directory" referring to a directory in a file system or other file storage apparatus. FIG. 8 illustrates one method 80 contemplated for the transmission of information about a terminal's current directory and the files within a terminal's current directory from emulators 2 to clients 3 according to the system of the present invention.

The method 80 starts at step 82 when a change in current directory is detected by an originating emulator 81 for a terminal 5 by means of the terminal output function 7 implemented by the emulator, by means of computer operating system facilities and/or software libraries, or by other means. The method 80 then proceeds to step 83 where the originating emulator 81 reads information about the new current directory (hereafter "the current directory") and the files within the new current directory (hereafter "the current files") using operating system or file system facilities associated with the file system or file storage apparatus on which the current directory resides. Such information may include the names, sizes, ownership, permissions, and any other metadata associated with the current directory and/or current files. Such information may also include the contents of the current directory and/or current files, From step 83, the method 80 proceeds to step 84 where the state of the terminal 5 according to emulator 67 is updated or modified to include the file and directory information determined in step 83.

From step 84, the method 80 proceeds to step 85 where the method 80 creates a message 15 containing the terminal state updates that resulted from the change in current directory and which were applied in step 84. The method 80 then proceeds to step 86 where the message 15 created in the previous step is transmitted on all incoming connections of emulator 81.

At optional step 87, the method 80 may monitor for any fixture changes to the contents and/or metadata of the current directory and/or current files, upon which changes further messages 15 containing terminal state updates may be produced and transmitted according to the method 80. Such a monitor may be established by emulator 81 using operating system or file system facilities associated with the file system or file storage apparatus on which the directory resides. Whether or not a monitor is established in step 87, the method 80 then proceeds to step 88.

At step 88 of method 80, the message 15 transmitted in step 86 is handled by intermediate emulators 2 and clients 3 using that portion of method 66 beginning at step 73 as illustrated in FIG. 7. The message 15 is treated by intermediate emulators and clients as any other message containing terminal state updates as created in step 71 of method 66. Actions taken by a client 3 on receipt of terminal state updates related to a current directory and/or current files may include updating the contents of a physical display or graphical window, generating a sound on a speaker, or any other implementation-specific actions performed by client 3 according to its operation.

After step 88, the method 80 then proceeds to step 89 and completes.

In some embodiments, it is contemplated that clients 3 may be capable of reading and writing data to and from any current files reported by the method 80, such data being transmitted by means of messages 15 exchanged with the originating emulator 81 using the system of the present invention.

Figure 9:
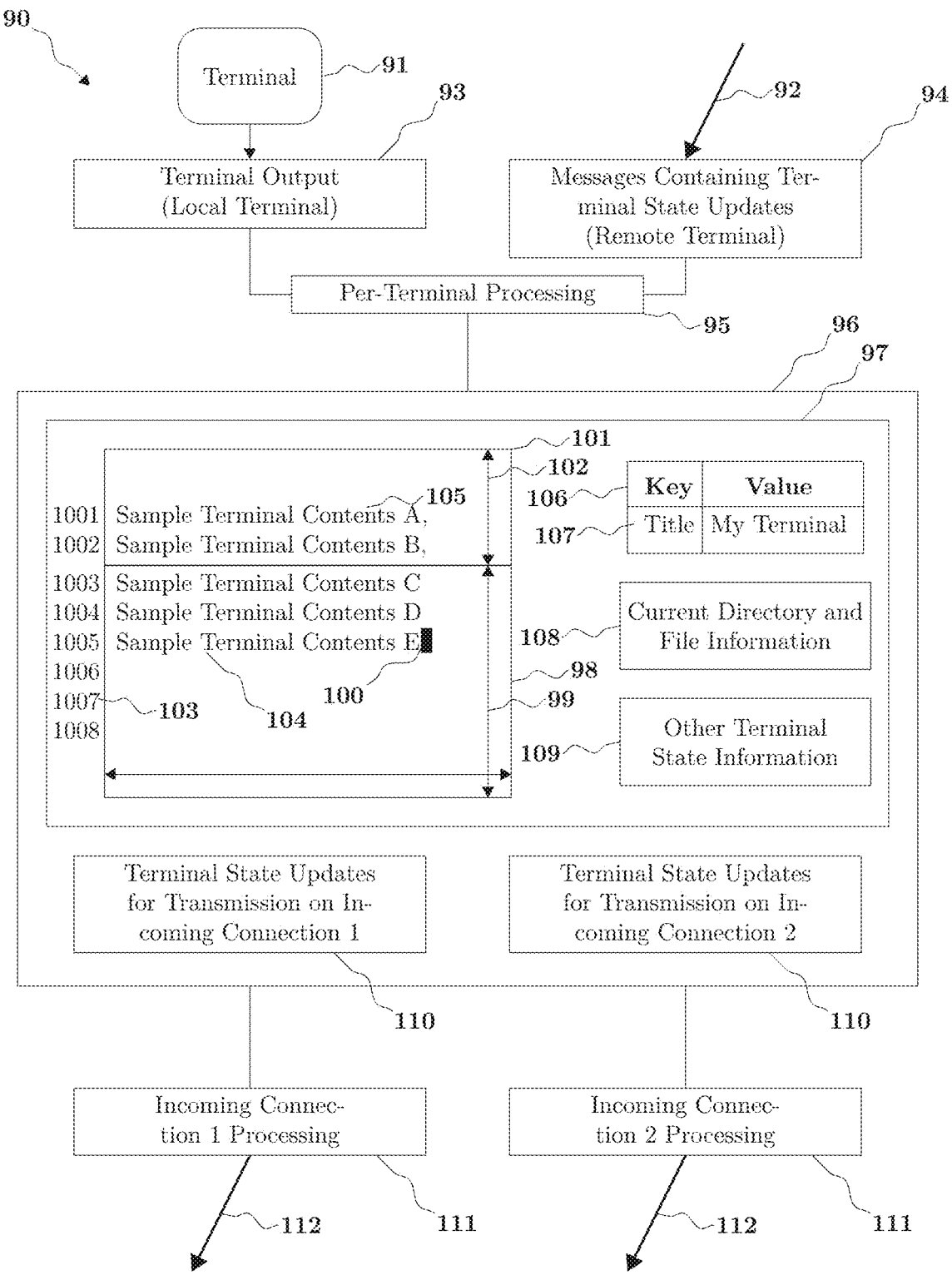
FIG. 9 is a block diagram of one embodiment of a system for the processing and transmission of terminal state updates within the system of FIG. 1.

FIG. 9 is a simplified block diagram of a system 90 for the processing of terminal state updates by emulators 2. System 90 may be employed to perform the steps 70, 71, 72 of the method 66 illustrated in FIG. 7. System 90 may also be employed to perform the steps 74, 75 of the method 66 illustrated in FIG. 7. Furthermore, system 90 may be employed to perform the steps 84, 85, 86 of the method 80 illustrated in FIG. 8, The system 90 processes terminal state updates for a terminal 5. The saved state 96 of the system comprises the saved state 97 of the terminal as well as a set of terminal state updates 110 for each incoming connection 112 of the emulator 2 implementing the system. In some embodiments, it is contemplated that the state 96 may be stored by emulators 2 in the other terminal information 36 of database 35 illustrated in FIG. 4b.

The saved terminal state 97 may include some or all of the following: a representation of the terminal screen 98; the screen dimensions 99, measured in rows and columns or in some other quantity; the position and appearance 100 of one or more cursors on the screen; textual and/or graphical screen contents 104, which may be indexed by a row number 103; a scrollback buffer 101 comprising additional textual and/or graphical contents 105 which have scrolled off the top of the terminal screen, which may also be indexed by a row number 103; the size 102 of the scrollback buffer 101, measured in rows or in some other quantity; a set 106 of textual key/value pairs which may include the terminal title 107; and current directory and current file information 108. The saved terminal state 97 may also include any other terminal state information 109, of any form, saved by the emulator 2 implementing the system 90 according to its operation.

The terminal 5 of the system 90 may be managed and controlled by the emulator 2 implementing the system 90. In this case, the terminal state updates processed by the system 90 are derived from the terminal output 93 received from the terminal output function 7 implemented by the emulator 2. Alternately, the terminal 5 of the system 90 may be managed and controlled by another emulator connected directly or indirectly to the emulator 2 implementing the system 90 by means of an outgoing connection 92. In this case, the terminal state updates processed by the system 90 are obtained from messages 94 received by means of the connection 92. In some embodiments, messages 94 may be created according to method 66 illustrated in FIG. 7.

Whether terminal state updates are derived from terminal output 93 or obtained from messages 94, a component 95 of system 90 is responsible for applying terminal state updates to the saved terminal state 97 and for adding terminal state updates to the set(s) 110 of terminal state updates for each incoming connection 112 (if present). For each incoming connection 112, another component 111 is responsible for transmitting terminal state updates from the set 110 associated with the incoming connection and, following transmission, removing the transmitted updates from the set 110. Components 111 may make reference to the saved state 97, if necessary, during the processing and transmission of terminal state updates from sets 110.

Figure 10:
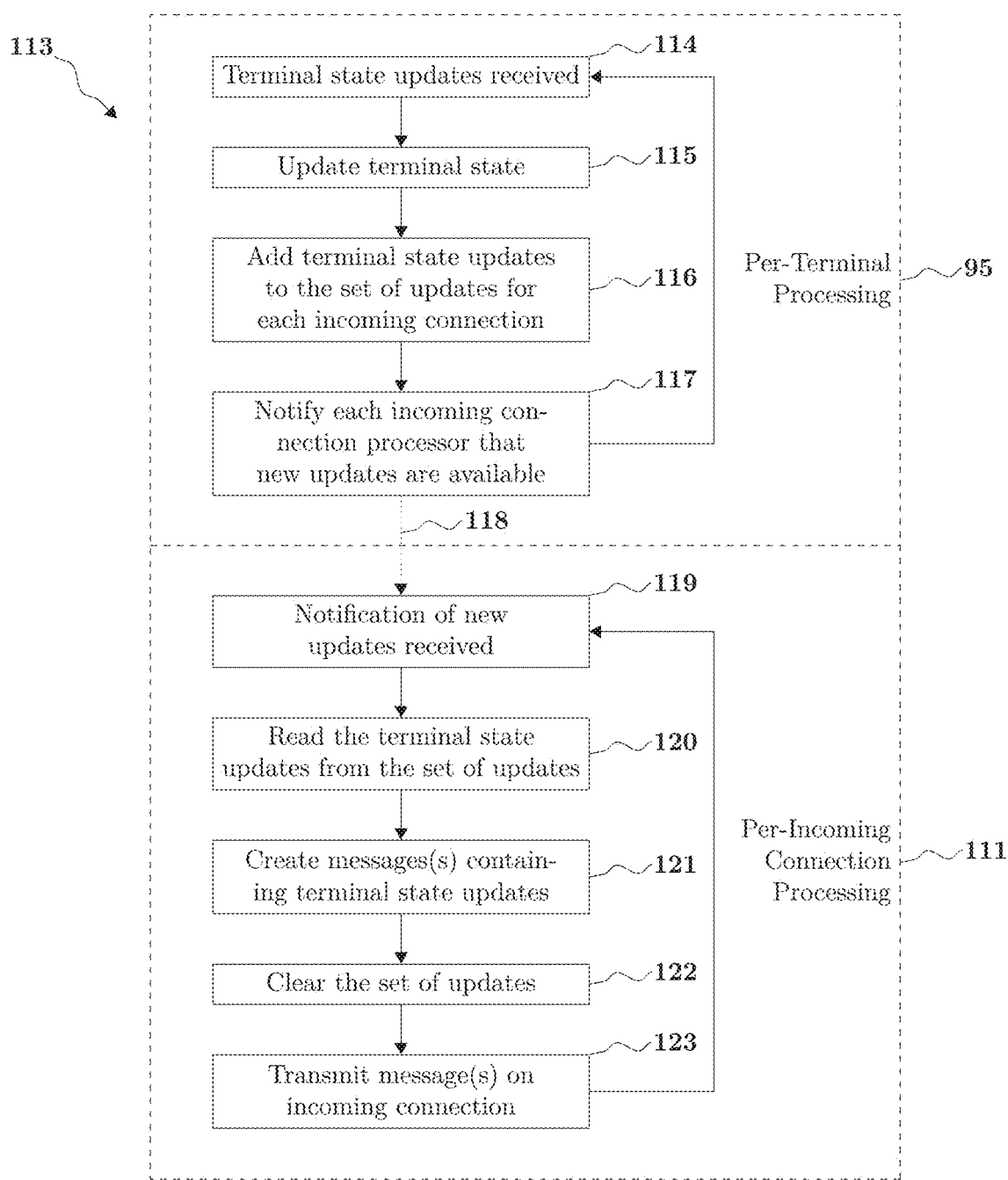
FIG. 10 is a flow chart illustrating a method of operation of the system of FIG. 9.

FIG. 10 illustrates one method 113 contemplated to be used by the system 90.

The method 113 starts at step 114 when terminal state updates are received by the component 95. The method 113 then proceeds to step 115 where the method applies the terminal state updates received in the previous step to the saved terminal state 97 of the system 90. The method 113 then proceeds to step 116 where the terminal state updates are added to the set(s) 110.

The method 113 then proceeds to step 117 where the method 113 sends a notification 118 to each component 111 to inform the component 111 that new terminal state updates are available to transmit.

After step 117, the method 113 returns to step 114 where component 95 waits for the next terminal state updates to arrive.

At step 119 of method 113, a notification 118 sent at step 117 is processed by a component 111. In some embodiments, such processing may occur in parallel to the processing performed by component 95 and/or the processing performed by components 111 for other incoming connections 112. After step 119, the method 113 proceeds to step 120 where the method 113 reads terminal state updates from the set 110 associated with the component 111 which received the notification 118.

At step 121, the method 113 creates one or more messages 15 containing the terminal state updates read from the set 110 at step 120. The method 113 then proceeds to step 122 where the set 110 is cleared. The method 113 then proceeds to step 123 where the message(s) created in step 121 are transmitted on the incoming connection 112 associated with component 111. The method 113 then returns to step 119 where component 111 waits for the next notification 118 to arrive.

Figure 11:
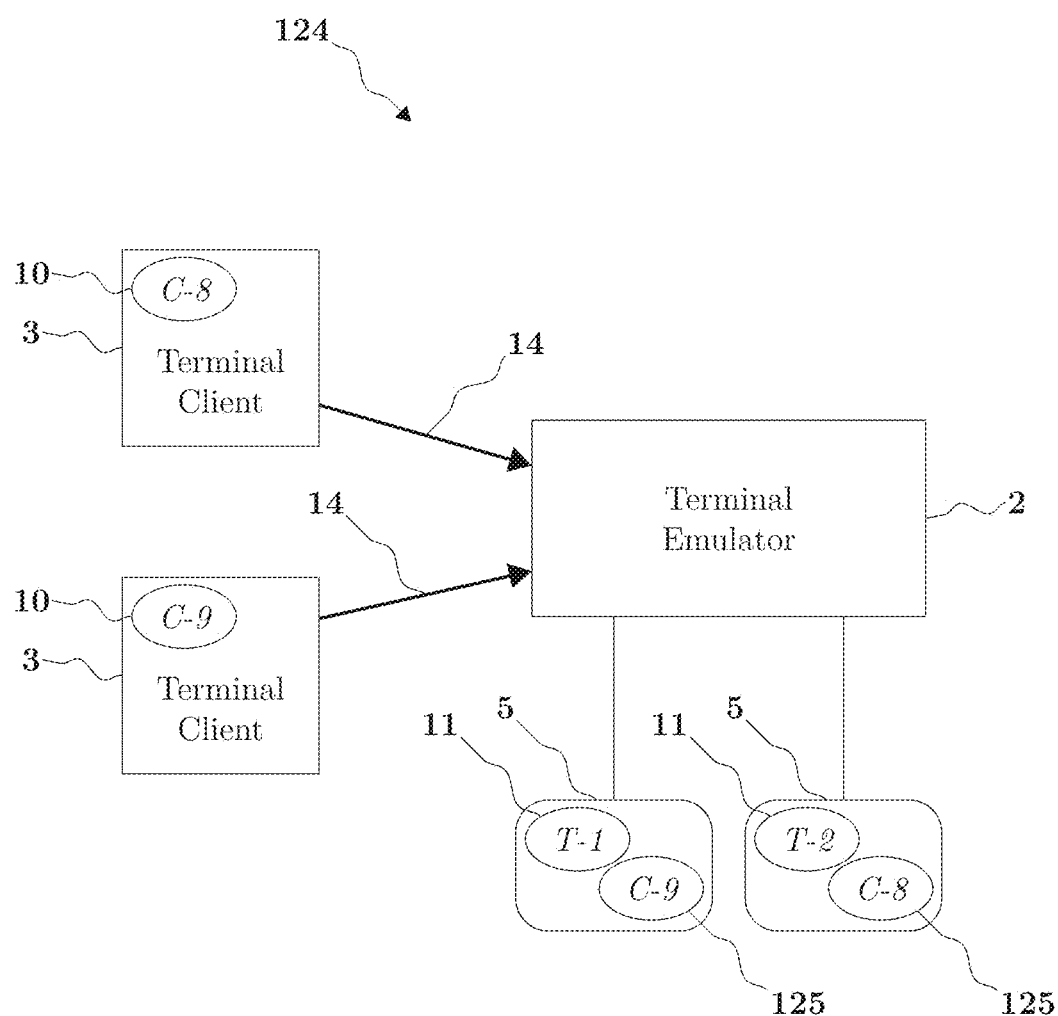
FIG. 11 is a block diagram of one embodiment of a system extending the system of FIG. 1 in which ownership information is assigned to terminals.

FIG. 11 is a simplified block diagram of a system 124 which extends the system 1 of FIG. 1 by assigning an optional owner identifier 125 to each terminal 5. The owner identifier 125 assigned to a terminal 5 may be the client identifier 10 of a client 3, a group or set of such identifiers, or any other identifier suitable for the purpose of specifying terminal ownership by clients 3.

In some embodiments, emulators 2 may reject messages containing terminal input data unless they originate from a client 3 whose identifier 10 is equivalent to, contained within, or otherwise matches the owner identifier 125 of the terminal 5 to which the terminal input data is addressed. More generally, emulators 2 may use the owner identifier 125 of a terminal 5 to determine whether actions requested by clients 3 by means of messages 15 should be allowed or disallowed. In some embodiments, emulators 2 may employ roles, permissions, or any other method of access control, authorization, or data security in concert with ownership identifiers 125 in order to determine whether actions requested by clients 3 by means of messages 15 should be allowed or disallowed.

Figure 12:
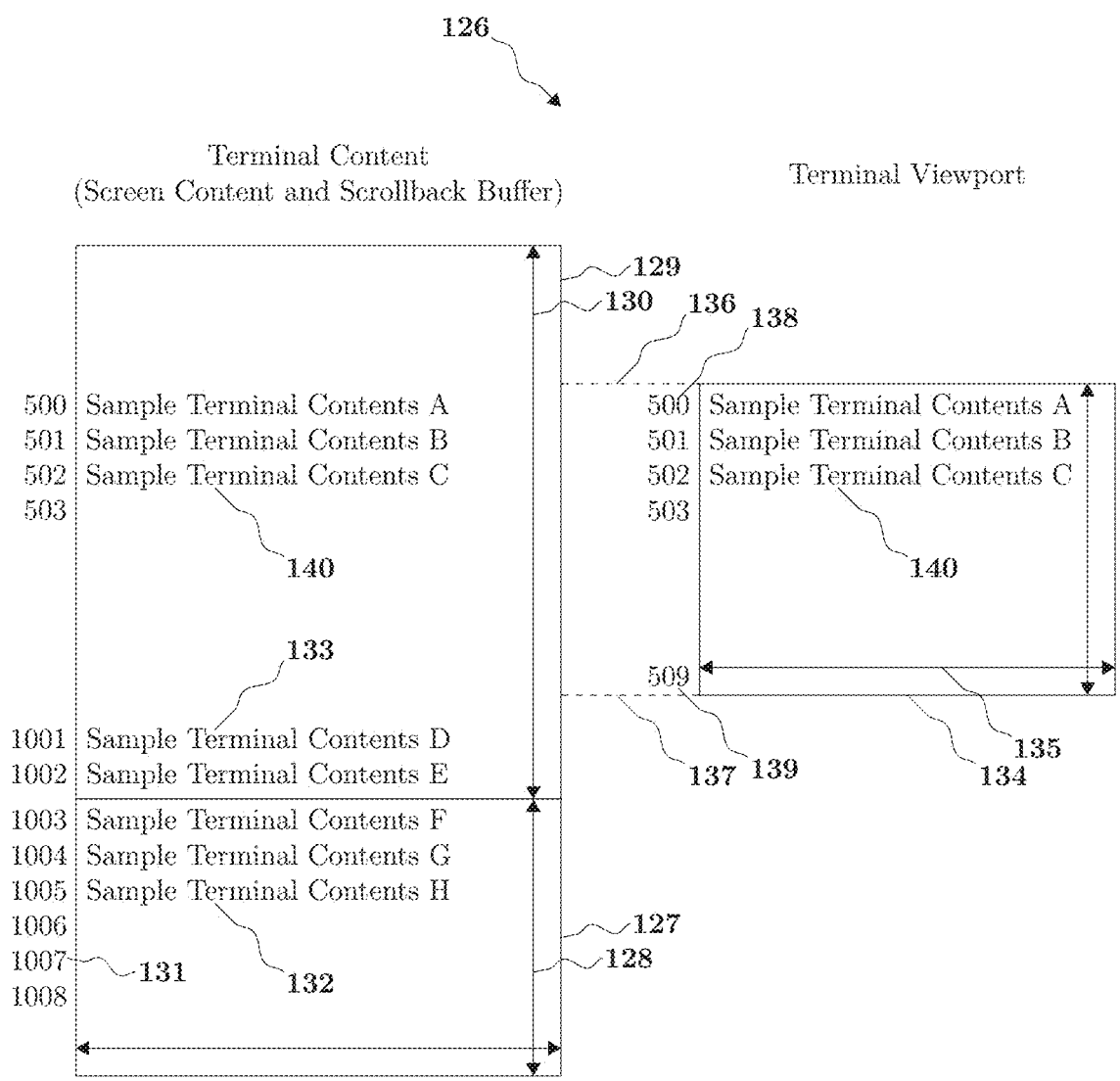
FIG. 12 is an illustration of one embodiment of a system for the display of terminal contents within viewports.

FIG. 12 is a simplified illustration of a system 126 for the display of textual and/or graphical terminal contents by emulators 2 and clients 3.

The system 126 provides for the display of the contents of a terminal 5. The content is divided into two portions: a representation of the terminal screen 127 and optional scrollback buffer 129. The screen 127 contains terminal contents 132 which are currently visible on the emulated terminal's screen. Its dimensions 128 correspond to the dimensions of the emulated terminal's screen, which may be measured in rows and columns or in some other quantity. The scrollback buffer 129 contains terminal contents 133 which have scrolled off the top of the emulated terminal's screen. It has a size 130 measured in rows or in some other quantity. In some embodiments, contents 132, 133 may be indexed by a row number 131 corresponding to a line of textual terminal content.

In some embodiments, contents 132, 133 may be stored within the saved terminal state 97 of the system 90 illustrated in FIG. 9. Messages 15 containing terminal state updates may be used to update the contents 132, 133. Such messages may be received by means of the method 66 illustrated in FIG. 7 and may be processed by means of the system 90 illustrated in FIG. 9.

The system 126 displays graphical content by means of a viewport 134 having dimensions 135 which are independent of the screen dimensions 127. The upper and lower edges of the viewport 134 are positioned at points 136 and 137 respectively. Points 136 and 137 may lie within the screen 127 or the scrollback buffer 129 at any location, provided that the distance between the two points is equal to the height of the viewport as defined by its dimensions 135. In some embodiments, the positions 136 and 137 may correspond to row numbers 138 and 139 respectively.

The contents 140 displayed in the viewport 134 comprise those contents 132, 133 which lie between the upper and lower positions 136 and 137 of the viewport. Such contents may comprise screen contents 132, scrollback buffer contents 133, or a combination of both.

Viewports 134 may be displayed to users by means of a computer monitor, projector, screen, or any other display, component, or element capable of presenting textual or graphical content. In some embodiments, viewports 134 may appear as, or as portions of, graphical windows within a windowing environment. In other embodiments, viewports 134 may be displayed within a web browser or other application.

Some embodiments may support the display of multiple viewports 134 for different terminals 5. Further embodiments may support the simultaneous display of multiple viewports 134 for the same terminal 5, each with independent dimensions 135 and positions 136, 137.

Figure 13:
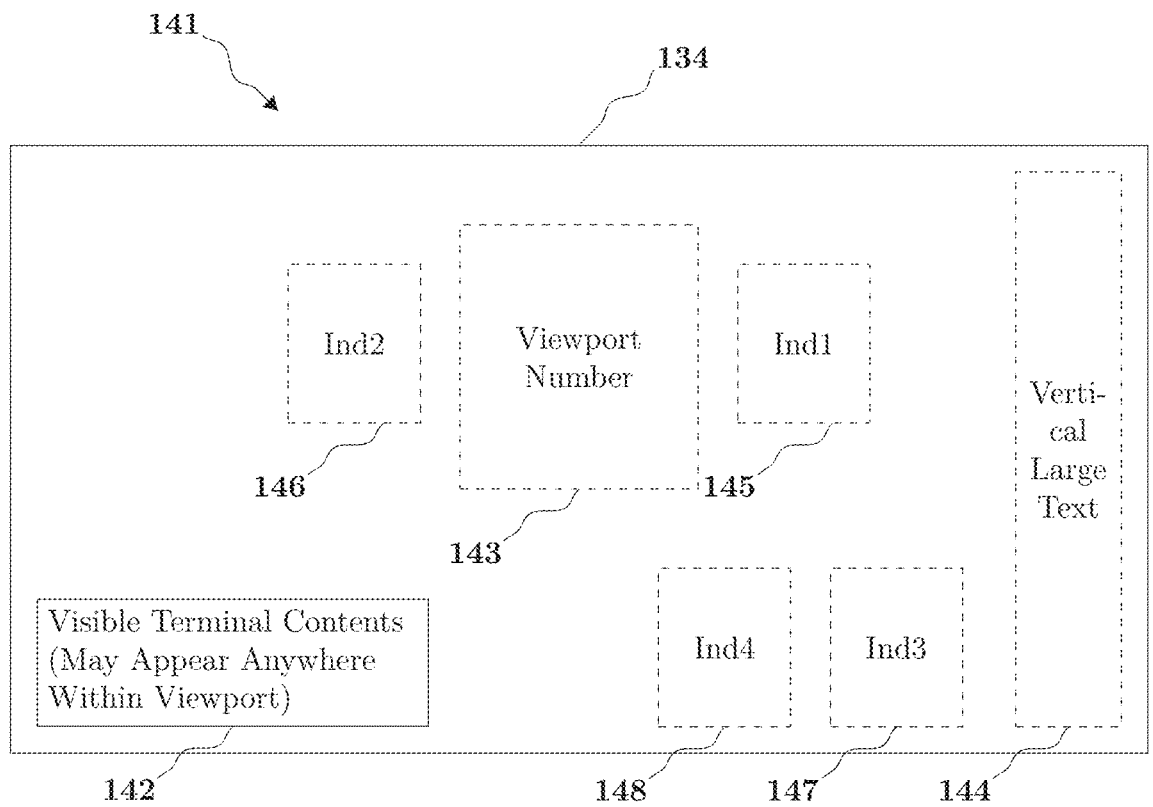
FIG. 13 is a block diagram of one embodiment of a system extending the system of FIG. 12 in which certain display elements are added to viewports.

FIG. 13 is an illustration of a system 141 which extends the system 126. The system 141 comprises a viewport 134 in which terminal contents 142 including screen contents 132 and/or scrollback buffer contents 133 may be displayed as in system 126. System 141 adds six optional display elements to the viewport 134.

Display element 143 serves to depict a numeral, number, or short mathematical expression. A client 3 or other component which is capable of displaying multiple viewports 134 for a terminal or terminals 5 may assign numbers to the viewports and may display the assigned numbers by means of display element 143 in order to assist users in distinguishing between viewports 134. Display element 143 is positioned at or near the center of viewport 134 or at a position above the center of viewport 134 and centered horizontally within the viewport.

Display element 144 serves to depict text or textual content, which is rendered in a vertical orientation and positioned at or near a vertical edge of the viewport 134. The vertical orientation is significant in providing a greater contrast with horizontally oriented terminal contents.

Display elements 145, 146, 147, 148 serve to depict graphical images or icons used as indicators to communicate various information to users. In some embodiments, display elements 145, 146, 147, 148 may communicate information from terminal state 97. In other embodiments, display elements 145, 146, 147, 148 may communicate information about the state of the client 3, emulator 2, or other system or application incorporating viewport 134. In further embodiments, display elements 145, 146, 147, 148 may communicate a combination of terminal state information, system state information, or any other information deemed appropriate for communication using such elements.

Display elements 145, 146 are positioned at or near the center of viewport 134 or at a position above or nearly above the center of viewport 134. When display element 143 is shown, display elements 145, 146 are positioned to either side of display element 143.

Display elements 147, 148 are positioned at or near a lower corner of viewport 134. When display element 144 is shown, display elements 147, 148 are positioned adjacent to both display element 144 and to the bottom edge of viewport 134.

Where terminal contents 142 overlap with display elements 143, 144, 145, 146, 147, 148, terminal contents 142 appear above display elements, such that portions of display elements 143, 144, 145, 146, 147, 148 may be concealed by terminal contents 142. It is contemplated that display elements are rendered in a manner which allows users to perceive and appreciate them even when they are partially concealed by terminal contents 142. As an example, the text of display elements 143, 144 may be rendered in a font size substantially larger than the font size of textual terminal contents 142. As another example, the color of display elements 143, 144, 145, 146, 147, 148 may differ from that of the terminal contents 142.

Figure 14:
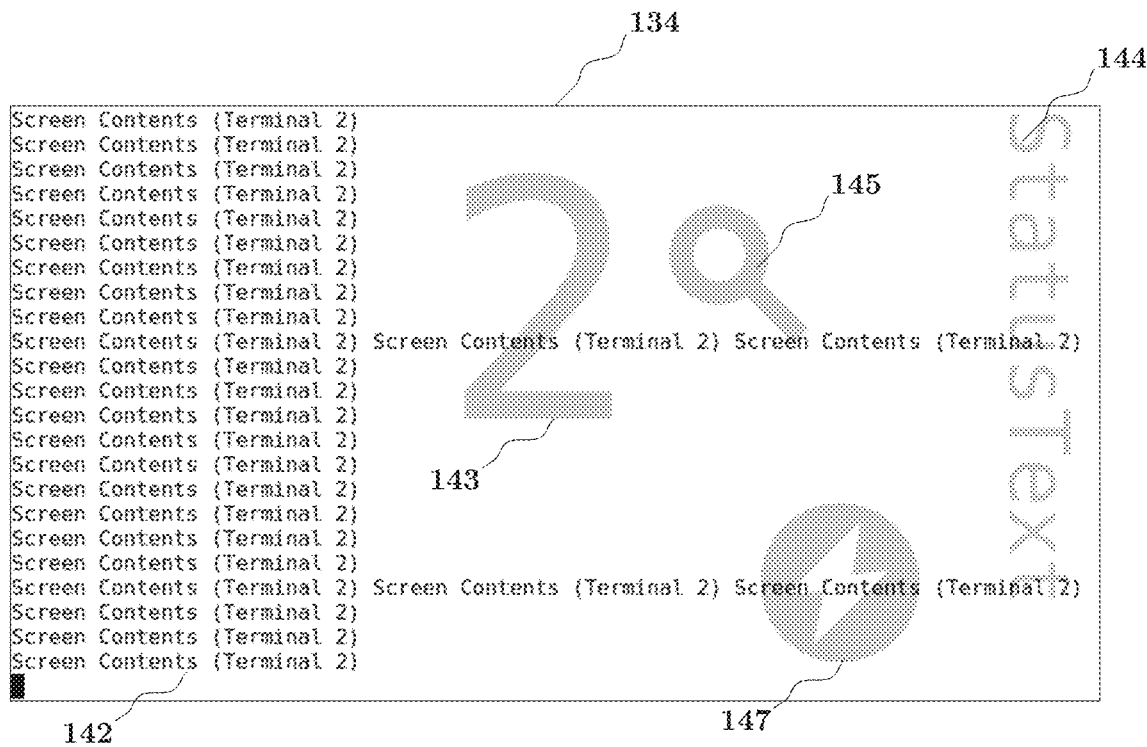
FIG. 14 is an illustration of one embodiment of the system of FIG. 13.

FIG. 14 depicts one contemplated embodiment of system 141, serving as an example only. This embodiment comprises a graphical window displaying a viewport 134. Display elements 143, 144, 145, and 147 are visible within the viewport 134. The images and text depicted are representative of how display elements 143, 144, 145, 146, 147, 148 may be used. Also displayed within the viewport 134 (and partially overlapping display elements 143, 144, 145, 147) are terminal contents 142 comprising screen contents 132.

Figure 15:
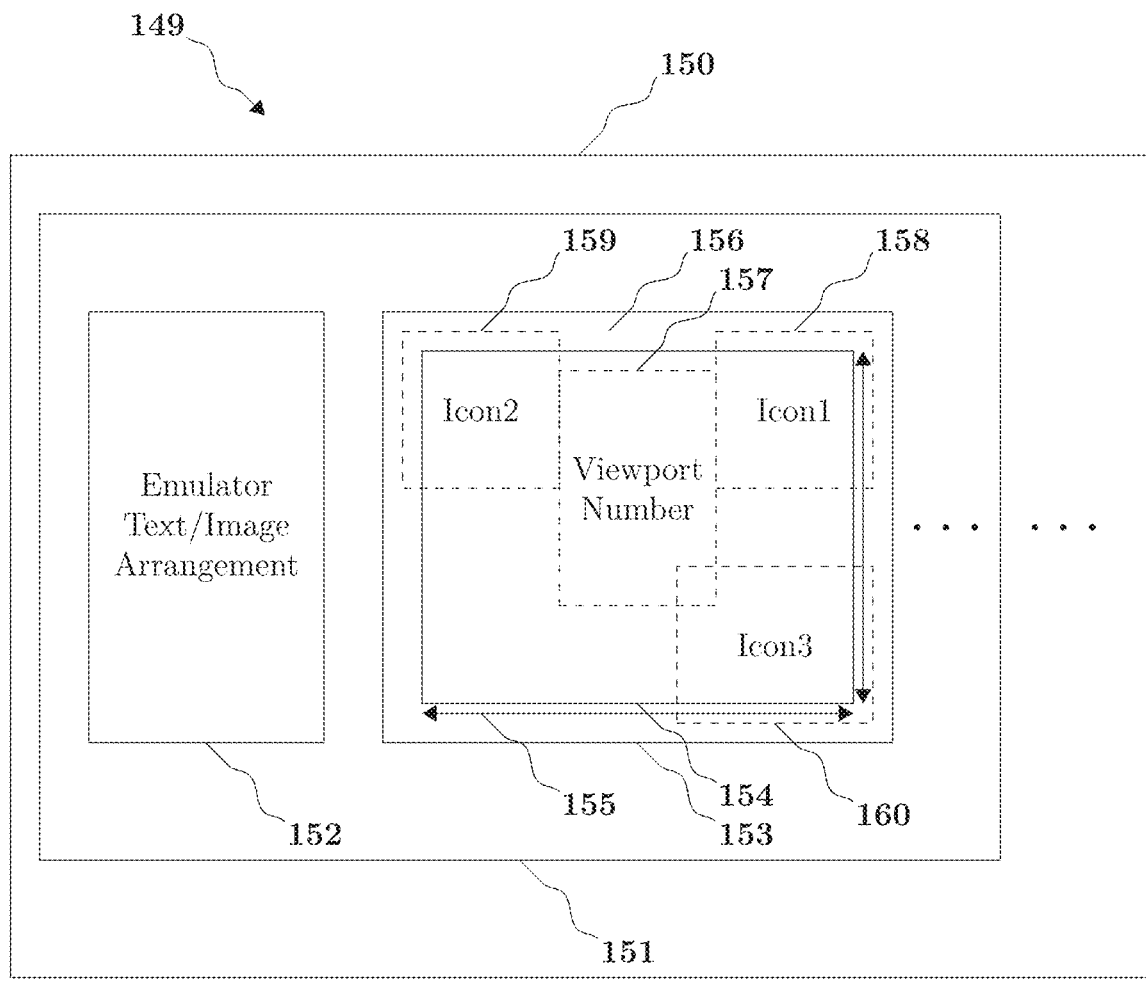
FIG. 15 is a block diagram of one embodiment of a system for the display of information about terminals and terminal emulators.

FIG. 15 is a simplified illustration of a system 149 for the display of an ordered list 150 of emulators 2 and terminals 5 by emulators 2 and clients 3. In some embodiments, the entries in databases 30, 35 may be used to construct the ordered list 150.

Ordered lists 150 may be displayed to users by means of a computer monitor, projector, screen, or any other display, component, or element capable of presenting graphical content. In some embodiments, ordered lists 150 may appear as, or as portions of, graphical windows within a windowing environment. In other embodiments, ordered lists 150 may be displayed within a web browser or other application.

Ordered list 150 consists of one or more groupings 151. At the beginning of each grouping 151 is a display element 152 representing an emulator 2. Display element 152 may consist of images, text, or an arrangement of images and text. Following display element 152 in grouping 151 are zero or more display elements 153 representing terminals 5 of the emulator 2 depicted by display element 152.

Ordered lists 150 may be oriented horizontally or vertically. When oriented vertically, each display element 152, 153 is positioned below the preceding element. When oriented horizontally, each display element 152, 153 is positioned to the left or right of the preceding element.

Each display element 153 contains a viewport 154 of system 126 for the terminal 5 depicted by display element 153. The viewport 154 has dimensions 155 which are proportional to the dimensions 128 of the terminal screen 127. The viewport 154 displays terminal contents 142 comprising screen contents 132. The screen contents 132 displayed in the viewport 154 are scaled by the same proportion as the viewport dimensions 155. The viewport 154 may be surrounded by a border 156. Each display element 153 additionally contains four optional display elements 157, 158, 159, 160.

Display element 157 serves to depict a numeral, number, or short mathematical expression. A client 3 or other component which is capable of displaying multiple viewports 134 for a terminal or terminals 5 may assign numbers to the viewports and may display the assigned numbers by means of display element 157 in order to assist users in distinguishing which viewport 134 is displaying the content of the terminal 5 depicted by display element 153. Display element 157 is positioned at or near the center of viewport 154 or at a position above the center of viewport 154 and centered horizontally within the viewport.

Display elements 158, 159, 160 serve to depict graphical images or icons used as indicators to communicate various information to users. In some embodiments, display elements 158, 159, 160 may communicate information from terminal state 97. In other embodiments, display elements 158, 159, 160 may communicate information about the state of the client 3, emulator 2, or other system or application incorporating viewport 134. In further embodiments, display elements 158, 159, 160 may communicate a combination of terminal state information, system state information, or any other information deemed appropriate for communication using such elements.

Where screen contents 132 displayed within viewports 154 overlap with display elements 157, 158, 159, 160, screen contents 132 appear below display elements 157, 158, 159, 160, such that screen contents 132 may be concealed by display elements 157, 158, 159, 160.

Display elements 158, 159 are positioned at or near the center of viewport 154 or at a position above or nearly above the center of viewport 154. When display element 157 is shown, display elements 158, 159 are positioned to either side of display element 157. Display element 160 is positioned at or near a lower corner of viewport 154. Display elements 158, 159, 160 may extend beyond the edges of viewport 154 and may extend into the area of the border 156, if present.

Figure 16:
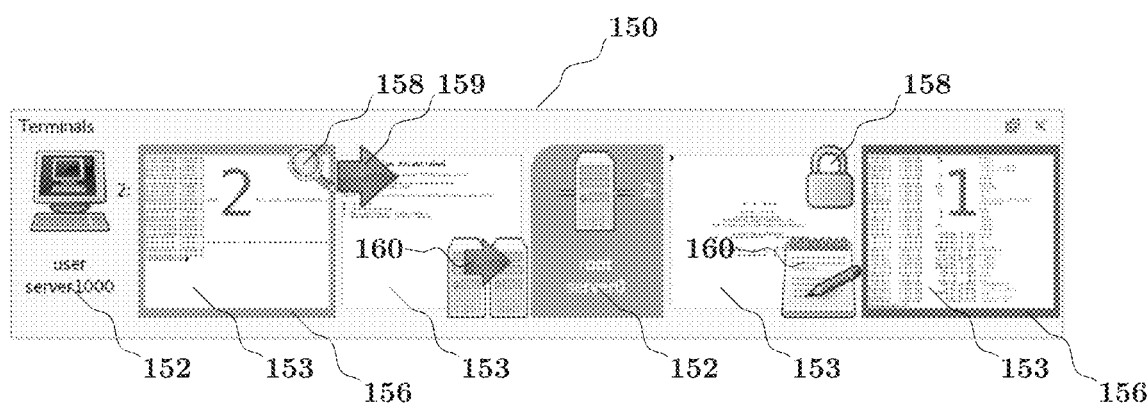
FIG. 16 is an illustration of one embodiment of the system of FIG. 15.

FIG. 16 depicts one contemplated embodiment of system 149, serving as an example only. This embodiment comprises a graphical window displaying an ordered list 150. The ordered list 150 contains two groupings 151. Each of the two groupings 151 contains a display element 152 depicting the corresponding emulator 2 using an arrangement consisting of an icon image and text. Each of the two groupings 151 contains two display elements 153 depicting terminals 5. Each display element 153 contains a viewport 154. Border 156 and display elements 157, 158, 159, 160 are visible within the display elements 153. The images and text depicted are representative of how display elements 156, 157, 158, 159, 160 may be used. Also displayed within the viewports 154 (and partially hidden by display elements 157, 158, 159, 160) are terminal contents 142 comprising screen contents 132.

As should be apparent to those skilled in the art, the embodiments of the present invention described above are merely exemplary of the present invention. Variations and equivalents of these embodiments are also contemplated to fall within the scope of the present invention.

What is claimed is:

1. A system for terminal emulation, comprising:
   a first processor;
   a first terminal emulator executable on the first processor, the first terminal emulator being addressable by a first identifier;
   a first router incorporated into the first terminal emulator;
   a second processor;
   a second terminal emulator executable on the second processor, the second terminal emulator being addressable by a second identifier;
   a second router incorporated into the second terminal emulator;
   a first bidirectional connection between the first terminal emulator and the second terminal emulator;
   a first terminal executable on the second processor, the first terminal being addressable by the second terminal emulator via a third identifier;
   a second bidirectional connection between the first terminal and the second terminal emulator;
   a second terminal executable on the second processor, the second terminal being addressable by the second terminal emulator via a fourth identifier;
   a third bidirectional connection between the second terminal and the second terminal emulator,
   wherein the first router and the second router cooperate to facilitate communication between the first terminal emulator and both the first terminal and the second terminal via the first bidirectional connection by employing at least one of the first identifier, the second identifier, the third identifier, and the fourth identifier;
   a terminal input incorporated into the second terminal emulator, wherein the terminal input delivers input data to the first terminal and to the second terminal;

a terminal output incorporated into the second terminal emulator, wherein the terminal output receives output data from the first terminal and from the second terminal;

an incoming connector incorporated into the second terminal emulator, wherein the incoming connector establishes an incoming connection to receive messages into the second terminal emulator; and an outgoing connector incorporated into the second terminal emulator, wherein the outgoing connector establishes an outgoing connection to transmit messages from the second terminal emulator.

2. The system of claim 1, wherein the messages include at least one of the third identifier or the fourth identifier.

3. The system of claim 1, wherein the outgoing connector transmits the messages via at least one of the first terminal or the second terminal.

4. The system of claim 3, wherein the outgoing connector establishes the second bidirectional connection and the third bidirectional connection for exchanging the messages between the second terminal emulator and the first terminal and the second terminal.

5. The system of claim 1, further comprising:
a terminal client connected to the first terminal emulator, wherein the terminal client generates the input data.

6. The system of claim 5, further comprising:
a keyboard incorporated into the terminal client for generating the input data.

7. The system of claim 6, further comprising:
a display incorporated into the terminal client for display of the output data.

8. A method for terminal emulation, comprising:
receiving a message by a first terminal emulator executable on a first processor, wherein the first terminal emulator is addressable by a first identifier and wherein the first terminal emulator incorporates a first router;

assessing if a first bidirectional connection exists between the first terminal emulator and a second terminal emulator executable on the second processor, wherein the second terminal emulator is addressable by a second identifier and wherein the second terminal emulator incorporates a second router;

if the first bidirectional connection exists, transmitting the message from the first terminal emulator to the second terminal emulator;

if the first bidirectional connection does not exist, establishing the first bidirectional connection before transmitting the message from the first terminal emulator to the second terminal emulator;

from the second terminal emulator, forwarding the message to one of a first terminal or a second terminal, wherein the first terminal is executable on the second processor, wherein the first terminal is addressable by the second terminal emulator via a third identifier, wherein a second bidirectional connection exists between the first terminal and the second terminal emulator, wherein the second terminal is executable on the second processor, wherein the second terminal is addressable by the second terminal emulator via a fourth identifier, and wherein a third bidirectional connection exists between the second terminal and the second terminal emulator;

employing at least one of the first identifier, the second identifier, the third identifier, and the fourth identifier by the first router and the second router to facilitate communication between the first terminal emulator and both the first terminal and the second terminal via the first bidirectional connection;

delivering input data, via a terminal input incorporated into the second terminal emulator, to the first terminal and to the second terminal; and receiving output data, via a terminal output incorporated into the second terminal emulator, from the first terminal and from the second terminal;

establishing an incoming connection, via an incoming connector incorporated into the second terminal emulator, to receive messages into the second terminal emulator; and establishing an outgoing connection, via an outgoing connector incorporated into the second terminal emulator, to transmit messages from the second terminal emulator.

9. The method of claim 8, wherein the messages include at least one of the third identifier or the fourth identifier.

10. The method of claim 8, wherein the messages are transmitted by the outgoing connector via at least one of the first terminal or the second terminal.

11. The method of claim 10, further comprising:
establishing, via the outgoing connector, the second bidirectional connection and the third bidirectional connection for exchanging the messages between the second terminal emulator and the first terminal and the second terminal.

12. The method of claim 8, further comprising:
generating, via a terminal client connected to the first terminal emulator, the input data.

13. The method of claim 12, wherein the terminal client comprises a keyboard for generating the input data.

14. The method of claim 13, wherein the terminal client incorporates a display for display of the output data.

15. The method of claim 8, further comprising:
identifying, by at least the second terminal emulator, a current directory for one of the first terminal or the second terminal;

recognizing a change in the current directory; and
generating an update based on the change.

16. The method of claim 15, further comprising:
transmitting, by at least the second terminal emulator, the update at least to the first terminal emulator.

* * * * *